United States Patent
Yao

(10) Patent No.: US 10,033,288 B2
(45) Date of Patent: Jul. 24, 2018

(54) AUXILIARY LOAD APPLICATION FOR INCREASING DATA RATE OF MESSAGES OR FOR INCREASING THE RESPONSE SPEED TO TRANSMITTED MESSAGES IN A FLYBACK CONVERTER

(71) Applicant: Dialog Semiconductor Inc., Campbell, CA (US)

(72) Inventor: Jianming Yao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/164,831

(22) Filed: May 25, 2016

(65) Prior Publication Data

US 2017/0346411 A1 Nov. 30, 2017

(51) Int. Cl.
*H02M 3/335* (2006.01)
*H02M 1/32* (2007.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 3/33576* (2013.01); *H02M 2001/0032* (2013.01); *H02M 2001/0064* (2013.01)

(58) Field of Classification Search
CPC ......... H02M 3/33507; H02M 3/33523; H02M 3/33576; H02M 3/33592; H02M 3/33553; H02M 1/32
See application file for complete search history.

(56) References Cited

U.S. PATENT DOCUMENTS

| | | | | |
|---|---|---|---|---|
| 6,222,747 B1 * | 4/2001 | Rinne | ..................... | H02M 1/38 307/39 |
| 2007/0285952 A1 * | 12/2007 | Zeng | ................. | H02M 3/33576 363/21.02 |
| 2008/0265670 A1 * | 10/2008 | Pansier | ................... | H02M 7/06 307/12 |
| 2011/0096573 A1 * | 4/2011 | Zhu | ................... | H02M 3/33523 363/21.17 |
| 2014/0009975 A1 * | 1/2014 | Morong | ........... | H02M 3/33523 363/21.13 |
| 2014/0036549 A1 * | 2/2014 | Li | ..................... | H02M 3/33507 363/21.12 |
| 2014/0078789 A1 * | 3/2014 | Li | ..................... | H02M 3/33523 363/21.15 |
| 2014/0085938 A1 * | 3/2014 | Shi | .................... | H02M 3/33523 363/21.01 |
| 2014/0098579 A1 * | 4/2014 | Kleinpenning | ... | H02M 3/33523 363/21.17 |
| 2014/0204625 A1 * | 7/2014 | Liu | ................... | H02M 3/33592 363/21.13 |
| 2014/0254215 A1 * | 9/2014 | Brinlee | ............ | H02M 3/33507 363/21.15 |
| 2014/0268911 A1 * | 9/2014 | Telefus | ............ | H02M 3/33523 363/21.08 |

(Continued)

*Primary Examiner* — Timothy J Dole
*Assistant Examiner* — Sisay G Tiku
(74) *Attorney, Agent, or Firm* — Haynes and Boone, LLP

(57) ABSTRACT

A system and method of controlling the data transfer rate of a switching power converter when the switching frequency is below a desired level by using an auxiliary load to at least maintain output regulation.

6 Claims, 7 Drawing Sheets

(56) References Cited

U.S. PATENT DOCUMENTS

| | | | |
|---|---|---|---|
| 2014/0268915 A1* | 9/2014 | Kong | H02M 3/33592 |
| | | | 363/21.14 |
| 2014/0268919 A1* | 9/2014 | Yao | H02M 3/33523 |
| | | | 363/21.15 |
| 2015/0280573 A1* | 10/2015 | Gong | H02M 3/33523 |
| | | | 363/21.14 |
| 2015/0285872 A1* | 10/2015 | Chung | H02M 1/15 |
| | | | 324/764.01 |
| 2015/0340890 A1* | 11/2015 | Yao | H02J 7/0042 |
| | | | 320/114 |
| 2016/0164420 A1* | 6/2016 | Kong | H02M 3/33523 |
| | | | 363/21.16 |
| 2016/0218628 A1* | 7/2016 | Yao | H02M 3/33507 |
| 2016/0329814 A1* | 11/2016 | Fahlenkamp | H02M 3/33523 |
| 2017/0093295 A1* | 3/2017 | Yao | H02M 3/33507 |

\* cited by examiner ated using opto-isolators, or alternatively across the transformer for a more cost-effective design. One such method of transferring data across the transformer instead of an opto-isolator is to transmit a data bit after the transformer reset time and prior to the power transistor being placed in the ON state. This may be accomplished in a variety of ways. For example, the secondary-side controller can short out the secondary-side diode subsequent to the transformer reset time to cause a pulse of voltage to be reflected onto the primary winding. This pulse occurs while the voltage on the primary winding is resonantly oscillating. To provide a data signal with such a pulse, the secondary-side controller may select which cycle of the resonant oscillation in which to transmit the pulse. The primary-side controller may then identify the binary value of the transmitted pulse based upon in which resonant cycle the pulse is received. A similar pulse may be transmitted in synchronous rectification embodiments in which the secondary-side diode is replaced by a synchronous rectification switch transistor by closing the switch The secondary-side controller may be configured to cause a sequence of such voltage pulses across the secondary side winding of the switching power converter representing a digital message encoding one or more control parameters.

AUXILIARY LOAD APPLICATION FOR INCREASING DATA RATE OF MESSAGES OR FOR INCREASING THE RESPONSE SPEED TO TRANSMITTED MESSAGES IN A FLYBACK CONVERTER

TECHNICAL FIELD

This application relates to switching power converters and more particularly to increasing communication data rates and response rates to transmitted messages in a flyback converter.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. This isolation introduces a problem in that the power switching occurs at the primary side of the transformer but the load is on the secondary side. The power switching modulation for a flyback converter requires knowledge of the output on the secondary side of the transformer. Such feedback can be obtained through opto-isolators bridging from the secondary side to the primary side, or through various primary-only feedback techniques.

Primary-only feedback techniques use the reflected voltage on the primary side of the transformer in each switching cycle. In a switching cycle for a flyback converter, the secondary current (the current in the secondary winding of the transformer) pulses high after the primary-side power switch is cycled off. The secondary current then ramps down to zero as power is delivered to the load. The delay between the power switch off time and the secondary current ramping to zero is denoted as the transformer reset time (Trst). The reflected voltage on the primary winding at the transformer reset time is proportional to the output voltage because there is no diode drop voltage on the secondary side as the secondary current has ceased flowing. The reflected voltage at the transformer reset time is thus directly proportional to the output voltage based upon the turn ratio in the transformer and other factors. Primary-only feedback techniques use this reflected voltage to efficiently modulate the power switching and thus modulate the output voltage without requiring an optocoupler or other means to sense the output voltage.

As devices and chargers become more advanced, there is a need to transmit data signals from the secondary side of the transformer to the primary side. In that regard, it is conventional for a secondary-side controller to interface through a Universal Serial Bus (USB) cable to a mobile device. Not only does the USB cable provide power from the flyback converter but it also carries data between the secondary-side controller and the mobile device. Data signals can be used to provide device information and/or desired operational parameters, such as a desired output voltage, current, or other operational setting and/or protection settings, such as device component or charger component temperature limits, for example. It will be appreciated that the specific types of data being transferred is not limited to those described above and any type of useful information may be transferred using the techniques disclosed herein.

As explained above, the secondary side of a flyback power converter is isolated from the primary side for protection from the AC mains. Thus, data transfer from the secondary-side controller to the primary-side controller must also be similarly isolated. To provide this isolation, data signals may transferred using opto-isolators, or alternatively across the transformer for a more cost-effective design. One such method of transferring data across the transformer instead of an opto-isolator is to transmit a data bit after the transformer reset time and prior to the power transistor being placed in the ON state. This may be accomplished in a variety of ways. For example, the secondary-side controller can short out the secondary-side diode subsequent to the transformer reset time to cause a pulse of voltage to be reflected onto the primary winding. This pulse occurs while the voltage on the primary winding is resonantly oscillating. To provide a data signal with such a pulse, the secondary-side controller may select which cycle of the resonant oscillation in which to transmit the pulse. The primary-side controller may then identify the binary value of the transmitted pulse based upon in which resonant cycle the pulse is received. A similar pulse may be transmitted in synchronous rectification embodiments in which the secondary-side diode is replaced by a synchronous rectification switch transistor by closing the switch The secondary-side controller may be configured to cause a sequence of such voltage pulses across the secondary side winding of the switching power converter representing a digital message encoding one or more control parameters.

Using this method, one or more bits of data are transferred during each switching cycle. It will be appreciated that there are various techniques for indicating a bit state through such shorting of the rectification for the secondary winding. For example, the secondary communication controller may modulate the phase of the secondary resonance ringing to transmit data. The modulation may also comprise amplitude modulation. But regardless of how the data is transmitted through a momentary ceasing of the rectification on the secondary side winding current, such techniques are dependent on the power switching rate. In particular, note that the data transfer occurs during the off time following a power switch on period. The data transfer rate thus remains limited by the switching frequency of the power switch. Thus, while data transfer rates may be sufficient at relatively high switching frequencies, during low frequency operation (for example during low output load), the data rate may fall below a useful level, particularly for urgent messages such as an overvoltage message or an undervoltage message.

Thus, low load operation can cause significant problems for achieving useful data transfer rates in flyback converters. Moreover, note that merely increasing the switching frequency risks driving the output voltage and current out of regulation. Accordingly, there is a need in the art for an improved system and method of increasing the data transfer rate from the secondary-side controller to the primary-side controller of a flyback converter during low load levels.

In contrast to data communication through the transformer, an optocoupler provides the secondary-side controller the ability to send data at constant rate regardless of the power switching frequency. In that regard, the optocoupler would not be used to provide feedback information as that information would come through primary-only feedback methods. Instead, the optocoupler may be dedicated to data communication from the secondary-side controller to the primary-side controller. Although such communication is independent from the switching frequency, note that the primary-side controller has no knowledge when a given bit of a message is received as to whether such a bit is part of an urgent message or not. Should the message be urgent such as on over or under voltage message, the primary-side controller needs feedback information but may be in a low frequency mode such that current feedback information is unavailable. There is thus a need in the art for flyback converters using primary-only feedback techniques that may respond more quickly to urgent messages transmitted through an optocoupler.

SUMMARY

To distinguish between data communication across the transformer as opposed to data communication through an optocoupler, the transmission of data from the secondary-side controller by selectively disabling the rectification of the secondary side current such as through shorting out a secondary-side diode or by closing a synchronous rectification transistor switch is denoted herein as "primary-only" data communication in that the primary-side controller senses the resulting pulsing of the drain voltage for its power switch transistor to receive the transmitted data. Although primary-only data communication may advantageously be performed without requiring an optocoupler, each data symbol can only be transmitted after an on period of the power switch. The data transmission rate for primary-only data communication is thus dependent upon the switching frequency of the power switch coupled to the primary winding of the flyback converter's transformer. The primary-side controller controls this switching frequency so as to be relatively low during low load states so as to not drive the output voltage and current out of regulation.

To force the primary-side controller to increase the switching frequency so as to enable an increased data rate for the primary-only data communication, the secondary-side controller triggers an activity pulse. An activity pulse is triggered the same way that a pulsing of the power switch's drain voltage is during primary-only data communication: by temporarily disabling the rectification of the secondary current. Such disabling depends upon how the rectification is performed. If a diode is used for the secondary current rectification, the secondary-side controller includes a switch that shorts out the diode to temporarily cease its rectification. Alternatively, if the rectification is performed using a synchronous rectification transistor switch, the secondary-side controller closes the synchronous rectification transistor switch to temporarily cease its rectification. Regardless of how the rectification is interrupted, an activity pulse distinguishes over a data pulse by its relationship to the resonant oscillation of the terminal voltage for the power switch (note that the power switch need not be a MOSFET but can also be a bipolar junction transistor). In particular, a data pulse occurs during the resonant ringing of the terminal voltage whereas an activity pulse occurs after the resonant ringing has decayed. Thus, despite both types of pulses being generated in the same way (through the shorting of the diode or by the closing of the synchronous rectification transistor switch), the primary-side controller may readily distinguish between these two types of pulses.

In conjunction with sending the activity pulse, the secondary-side controller activates an auxiliary load. This activation causes the output voltage to drop due to the resulting conduction of charge through the auxiliary load. The primary-side controller is configured to respond to the activity pulse by the triggering of a power switch cycle such that the primary-side controller then senses the reduction in the output voltage and increases the switching frequency accordingly. The secondary-side controller may then proceed to transmit messages in a timely fashion that would otherwise take prohibitively long due to the low load condition and resulting low switching frequency.

The auxiliary load may be advantageously employed in flyback converters that do not use primary-only data communication but instead transmit data through a optoisolator. Even a relatively inexpensive optoisolator may support a data rate in the KiloHz range. Since primary-only techniques are used by the primary-side controller to obtain feedback on the output voltage, the optoisolator is dedicated to data communication between the secondary-side controller and the primary-side controller. The resulting data rate is independent of the switching frequency and thus independent of the load level. However, an individual data pulse basis, the primary-side controller has no way of knowing whether such a data pulse belongs to an urgent message or not. Should the primary-side controller wait until the sufficient number of data pulses are received over the optocoupler to transmit an urgent message, the output voltage may be dangerously over or under the desired regulation level. To respond to an overvoltage or an undervoltage message, the primary-side controller must generate a power pulse (a cycling of the power switch) to obtain feedback information on the output voltage. To provide improved response time to urgent messages, a primary-side controller is disclosed that reacts to the receipt of a data pulse by triggering a power switch cycle. But such a power switch cycle may drive the output voltage out of regulation during low-load conditions. Thus, the secondary-side controller is configured to activate the auxiliary load in conjunction with the transmission of a data pulse during low load states as determined by whether the switching frequency is below a threshold level.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A secondary-side controller is provided with an auxiliary load that is selectively activated. This auxiliary load may be used for flyback converters that have an independent data channel for secondary-to-primary data communication such as through the use of an optocoupler or a capacitor. Alternatively, the auxiliary load may be used in primary-only data communication embodiments in which the feedback channel and the data channel are shared. The primary-only data communication embodiment will be discussed first followed by a discussion of the independent data channel embodiment.

Primary-Only Data Communication

To address the need in the art to increase the data rate for primary-only data communication between a secondary-side controller and a primary-side controller in a flyback converter when the switching frequency is below a threshold level, the secondary-side controller triggers an activity pulse and activates the auxiliary load. The primary-side controller responds to the activity pulse by triggering a power switch transistor cycle such that the output voltage is sensed through the resulting reflected voltage on the power switch transistor terminal following the opening of the power switch at the close of the power switch cycle. The primary-side controller senses the drooping of the output voltage caused by the activation of the auxiliary load by increasing the switching frequency. In this fashion, the secondary-side controller may increase the primary-only data communication rate since each data pulse requires a corresponding power switch cycle.

Figure 1A:
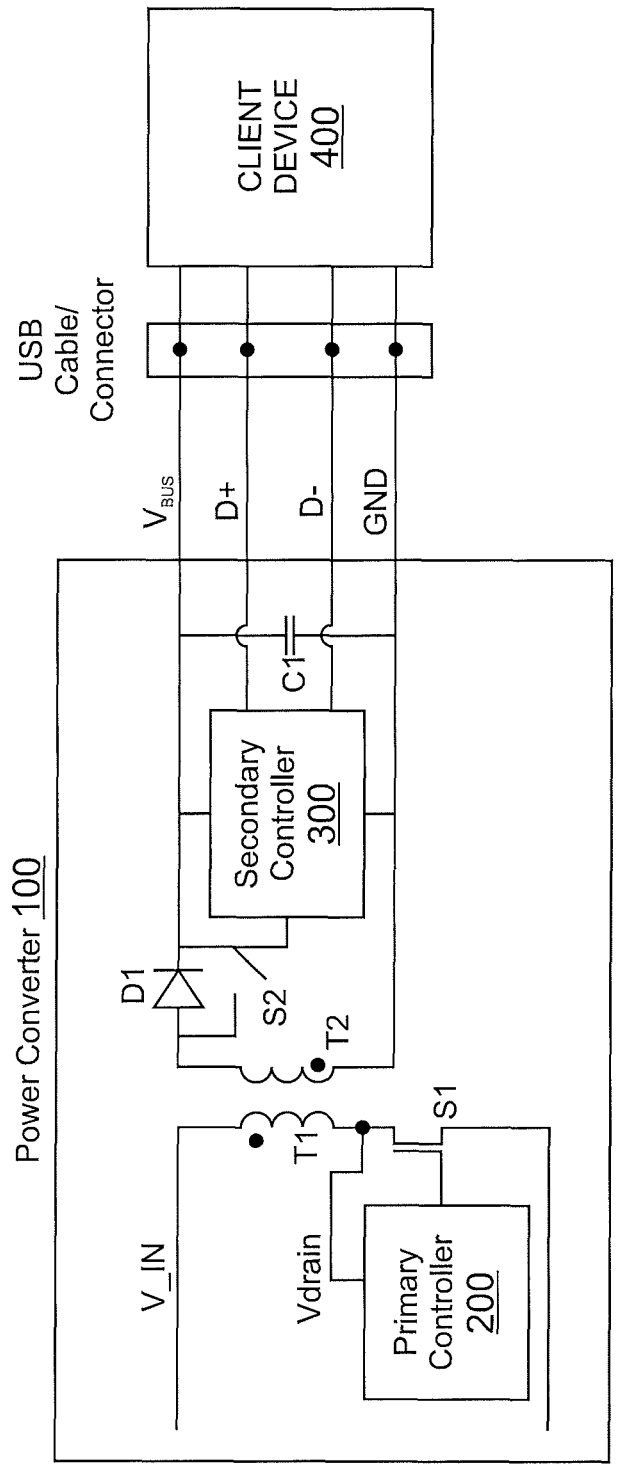
FIG. 1A is a diagram of a flyback converter with primary-only data communication implemented through the shorting of an output diode in which the secondary-side controller includes an auxiliary load activated for low-load conditions in accordance with an aspect of the disclosure.
Figure 1B:
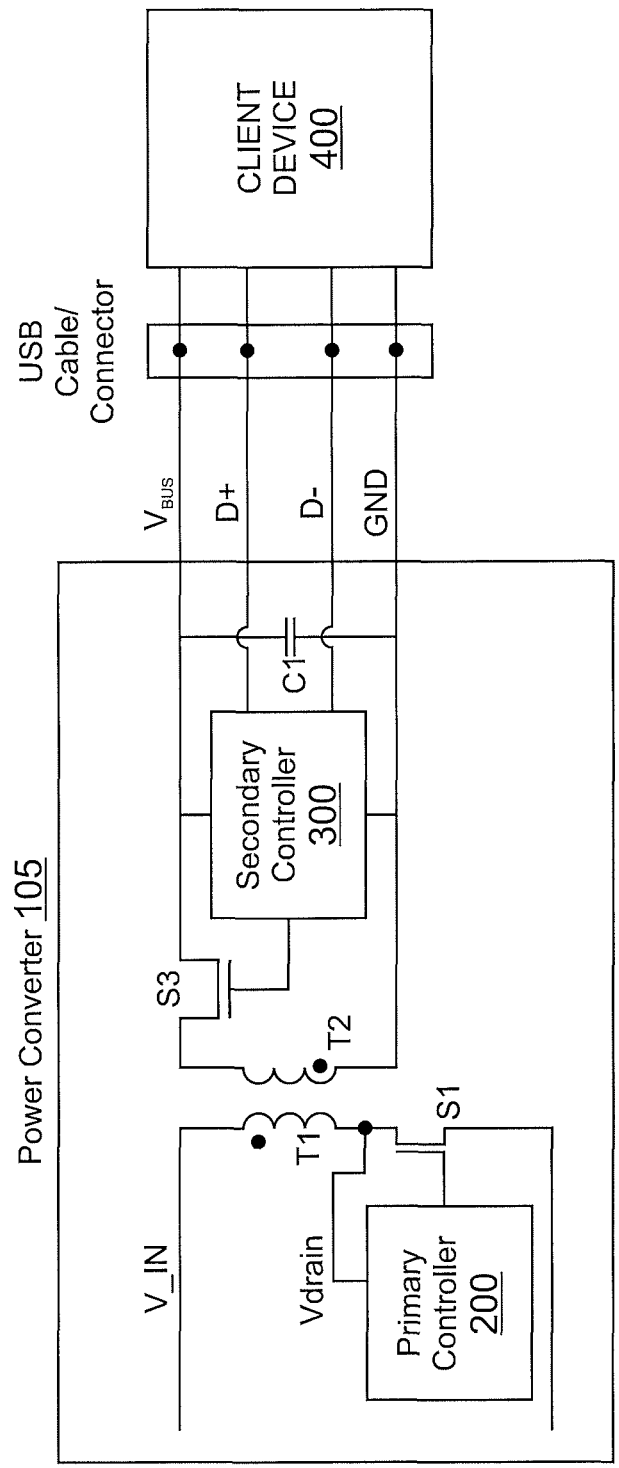
FIG. 1B is a diagram of a flyback converter with primary-only data communication implemented through the closing of a synchronous rectification switch in which the secondary-side controller includes an auxiliary load activated for low-load conditions in accordance with an aspect of the disclosure.

The implementation of the data pulses and the activity pulses depends upon how the secondary winding current is rectified. This rectification may be implemented using either a diode or a synchronous rectification transistor switch. For example, turning now to the drawings, an example flyback converter 100 is shown in FIG. 1A in which a secondary controller 200 transmits activity pulses and data pulses by shorting out an output diode D1. In contrast, an example flyback converter 105 is shown in FIG. 1B in which secondary controller 200 transmits activity pulses and data pulses by closing a synchronous rectification transistor switch S3. The following discussion will focus upon flyback converter 100 but it will be appreciated that the same auxiliary load activation principles to trigger an increased primary-only data communication rate through an increased power switching frequency apply equally to flyback converter 105.

Flyback converter 100 also includes a primary controller 200 that controls the cycling of a power switch transistor S1 coupled between ground and the primary winding T1 of the transformer. A rectified input voltage (Vin) drives a primary current though primary winding T1 when the primary controller 200 switches on power switch S1. In power converter 100, the power switch is a MOSFET power switch but it will be appreciated that bipolar junction transistor power switches may be used in alternative embodiments.

When the power switch S1 closes, the primary winding current ramps up from zero to some maximum value, whereupon primary controller 200 opens power switch S1. When power switch S1 opens, a secondary winding current through a secondary winding T1 of the transformer jumps from zero to some maximum value and then begins to ramp to zero as energy is delivered to a load 400 such as a mobile device. A rectifying diode D1 that couples between secondary winding T1 and load 400 becomes forward biased by the opening of power switch S1 such that the stored energy in the transformer is delivered as an output voltage ($V_{BUS}$) across load 400 as filtered by a load capacitor C1. This delivery of energy to load 400 produces a reflected voltage on the primary winding T1 that is a function of the voltage drop across the diode D1 and the output voltage. As this energy delivery is depleted, the secondary winding current will drop to zero such that there is no diode voltage drop, whereupon the reflected voltage is directly proportional to $V_{BUS}$. As discussed earlier, this time is denoted as the transformer reset time (Trst) and thus represents the ideal time to sample the reflected voltage as represented by the drain voltage (Vdrain) for power switch S1 to obtain an accurate estimate of the output voltage $V_{BUS}$.

The feedback voltage Vdrain is just one parameter that may be used in the feedback control implemented by primary controller 200. For example, the primary winding current may be sampled through a sense resistor $R_{sense}$ (not illustrated) to produce an $I_{sense}$ voltage that represents the primary winding current amplitude. But there may be periods of little or no load in which primary controller 200 slows the cycling of power switch S1 so as to prevent the output voltage from being driven out of regulation.

Figure 2:
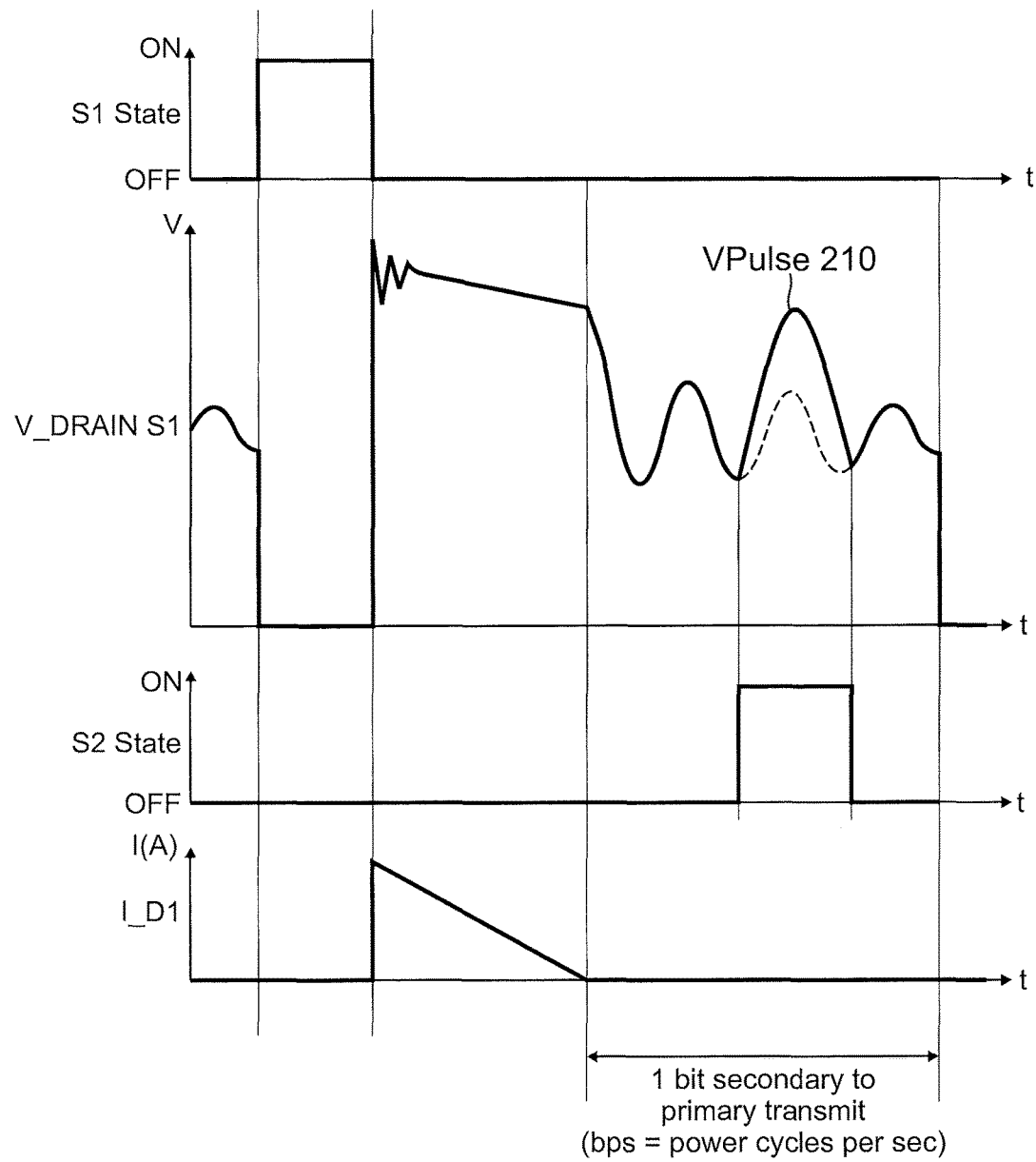
FIG. 2 illustrates operational waveforms for a method of data transmission for the system in FIG. 1A.

Secondary controller 300 may be connected to load 400 through data transmission lines D+ and D− within a USB cable. The mobile device may thus alert secondary controller 300 to alarm conditions such as an over voltage or an under voltage condition through the data transmission lines in the USB cable. In turn, secondary controller 300 is capable of sending data to primary controller 200 by triggering a pulsing of the drain voltage for power switch S1 by shorting diode D1 through a transistor switch S2. Secondary controller 300 pulses the drain voltage for power switch S1 by shorting diode D1 during the off time of power switch S1 following a power pulse. If secondary controller 300 pulses the drain voltage after the resonant oscillations of the drain voltage have been dampened, primary controller 200 interprets the pulse as an activity pulse. On the other hand, if the pulsing occurs during a cycle of the resonant oscillation, primary controller 300 interprets the pulse as a data pulse. Data pulses may be transmitted in a number of ways. For example, the selection of a particular cycle for the resonant oscillation in which a data pulse is transmitted may be used by primary controller 200 to determine the binary value of the received data pulse (not that more than a single bit may be transmitted by a data pulse in alternative embodiments). FIG. 2 shows operational waveforms of the current across diode D1, the voltage across the drain of switch S1 and the switching states of switches S1 and S2 for an embodiment in which the data pulses occur within specific resonant cycles to transmit data. As shown in FIG. 2, the drain of power switch S1 is grounded when power switch S1 is on. As the power switch S1 turns off, the drain voltage (V_DRAIN S1) jumps to some maximum value and then begins to decay towards the "knee" as the secondary current (which is also the current I_D1 through diode D1) drops to zero. Following this transformer reset time, the drain voltage begins to resonantly oscillate. In FIG. 2, secondary controller 300 has selected the second resonant oscillation cycle as the cycle in which a data pulse 210 is transmitted by placing switch S2 in the on state. Another binary value may be transmitted by selecting a different resonant oscillation cycle or period.

Using this method, one or more bits of data are transferred during each switching cycle. It will be appreciated that various techniques for indicating a bit state may be used without deviating from the scope of the disclosure. For example, the secondary controller 300 may modulate the phase of the secondary resonance ringing and primary controller 200 can be configured to detect a delay in the idle oscillation, or detect an interruption in the idle ring transient to detect said data. The modulation may also comprise amplitude modulation and the controller can be configured to detect a change of amplitude of the resonance ringing to thereby detect said data. It will be appreciated that other data detection techniques may be applied without deviating from the scope of the disclosure. Referring again to FIG. 1B, secondary controller 200 generates a similar data pulse by closing synchronous rectification transistor switch S3.

The data transfer rate comprising a number of bits per second (BPS) remains limited by the switching frequency of the power switch S1. As explained above, the data transfer rate may be sufficient at high switching frequencies. However, during low frequency operation (for example during low output load), the primary-only data communication rate can drop below a useful level for a desired data transfer. In these situations, the data transfer rate may be below a useful level because it cannot receive sufficient information in a set amount of time. In other cases, such as during periods of zero output load in which the power switch S1 is simply not being cycled, data bits may not be transferred at all.

To trigger an increased switching rate so that the primary-only data communication data rate may be increased, primary controller 200 generates an activity pulse. The activity pulse is triggered in the same fashion as a data pulse except that it occurs after the resonant oscillation has effectively ceased. Should primary controller 200 detect a pulsing of the drain voltage for power switch S1 at such a quiescent time, it interprets the pulse as an activity pulse. Such activity pulses are known in that they are triggered, for example, when secondary controller 200 detects through the data channels in the USB cable that a mobile device has become attached to the USB cable. In such a conventional case, the activity pulse spurs primary controller 200 to trigger a power switch cycle so that it can begin responding to the application of load 400. However, as used herein, an activity pulse is also used despite the presence of a low load state.

Figure 3:
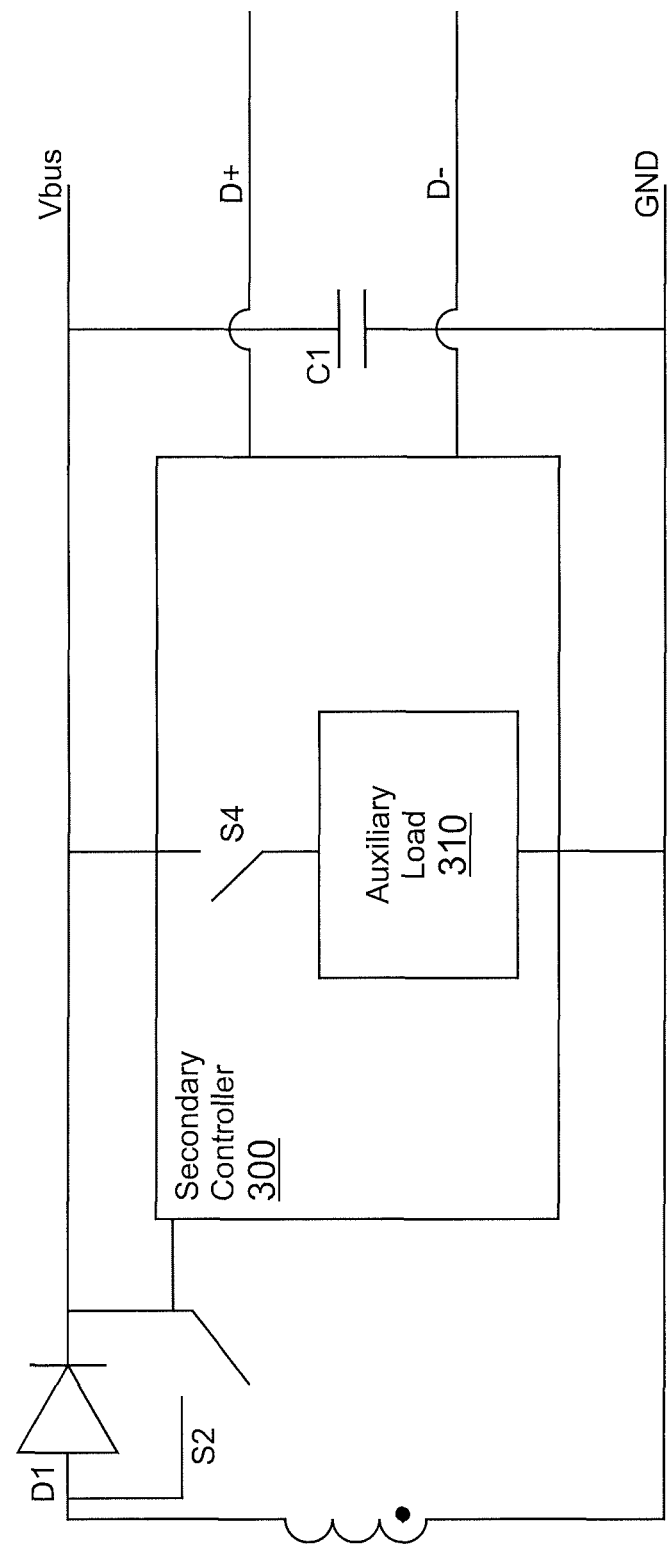
FIG. 3 is a diagram of a secondary controller and an auxiliary load in accordance with an embodiment of the disclosure.

In particular, secondary controller 300 will also trigger an activity pulse not only for the conventional case of alerting primary controller 200 about the application of a load but also when secondary controller 300 needs to increase the switching frequency to increase the primary-only data communication rate. In that regard, secondary controller 300 will trigger an activity pulse when it needs to increase the primary-only data communication rate because the switching frequency is below some threshold value (e.g., less than 10 KHz). To lower the output voltage so as to trigger an increased switching frequency, secondary controller 300 in system 100 contains an auxiliary load 310 as shown in FIG. 3. Auxiliary load 310 is arranged in parallel with the load (FIG. 2) when secondary controller 300 activates it by closing a switch S4. Closing switch S4 causes the total load (the output load if present and the auxiliary load 310) to be such that the power converter increases the switching frequency to a rate sufficient for a particular data transmission thereby transferring a desired number of bits in a desired amount of time. Secondary controller 300 can control and vary the auxiliary load 310, for example, by connecting auxiliary load 310 for different durations though switch S4. In some embodiments, the load may comprise an adjustable load. The auxiliary load 310 functions to at least prevent the output power from increasing past the regulation point as a result of changes to the switching frequency, for example, by increasing the switching frequency to a rate sufficient for data transmission. Once the data transmission is complete, the system can resume normal operation, for example, by disconnecting the auxiliary load and resuming PFM mode operation if the output load current remains sufficiently low, or PWM mode if the output load demand is sufficient, for example. It will be further appreciated that the system can operate in accordance with instructions provided in the data transmission, for example by operating at a certain frequency, current, voltage, or other operational conditions such as temperature protection. It will be further appreciated that an instruction in the data transmission may cause other configuration changes. It will be further appreciated that more than one instruction may be transmitted as part of the data transfer. In this fashion, improved data transmission is achieved while maintaining regulation of the output load.

Figure 4:
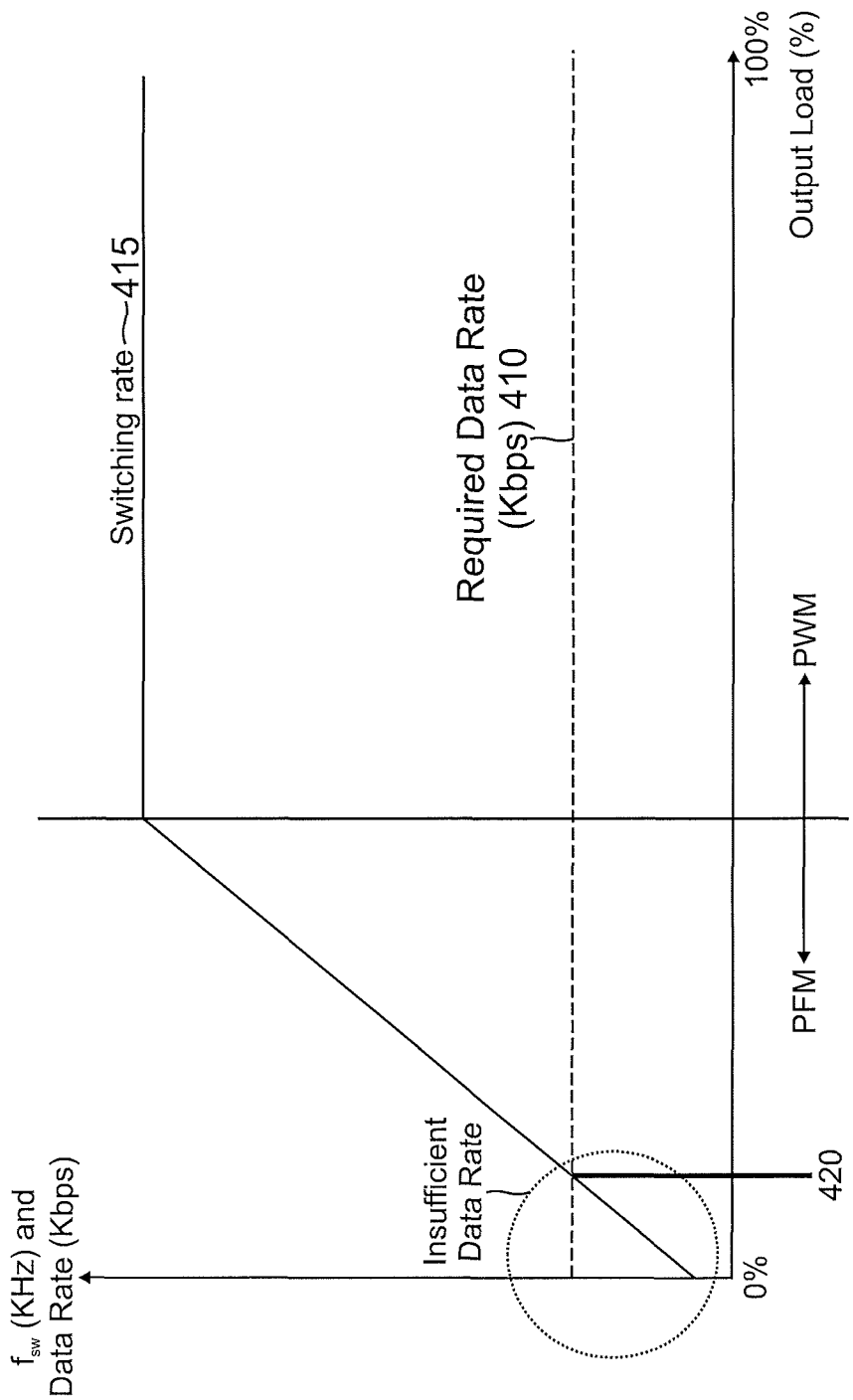
FIG. 4 illustrates how data rates fall with respect to output load.

FIG. 4 shows a chart of primary-only communication data rate and switching rate against output load percentage for secondary controller 300. As shown in FIG. 4, the required data rate 410 for a desired data transmission is represented by a dashed line. When a switching rate 415 is above the required data rate 410, there is no need to trigger an increased switching frequency. As the output load decreases, for example when the output load falls below the level indicated at output load 420, the switching rate 415 falls below the required data rate 410 such that secondary controller 300 triggers an activity pulse and closes switch S4 to activite auxiliary load 310.

Figure 5:
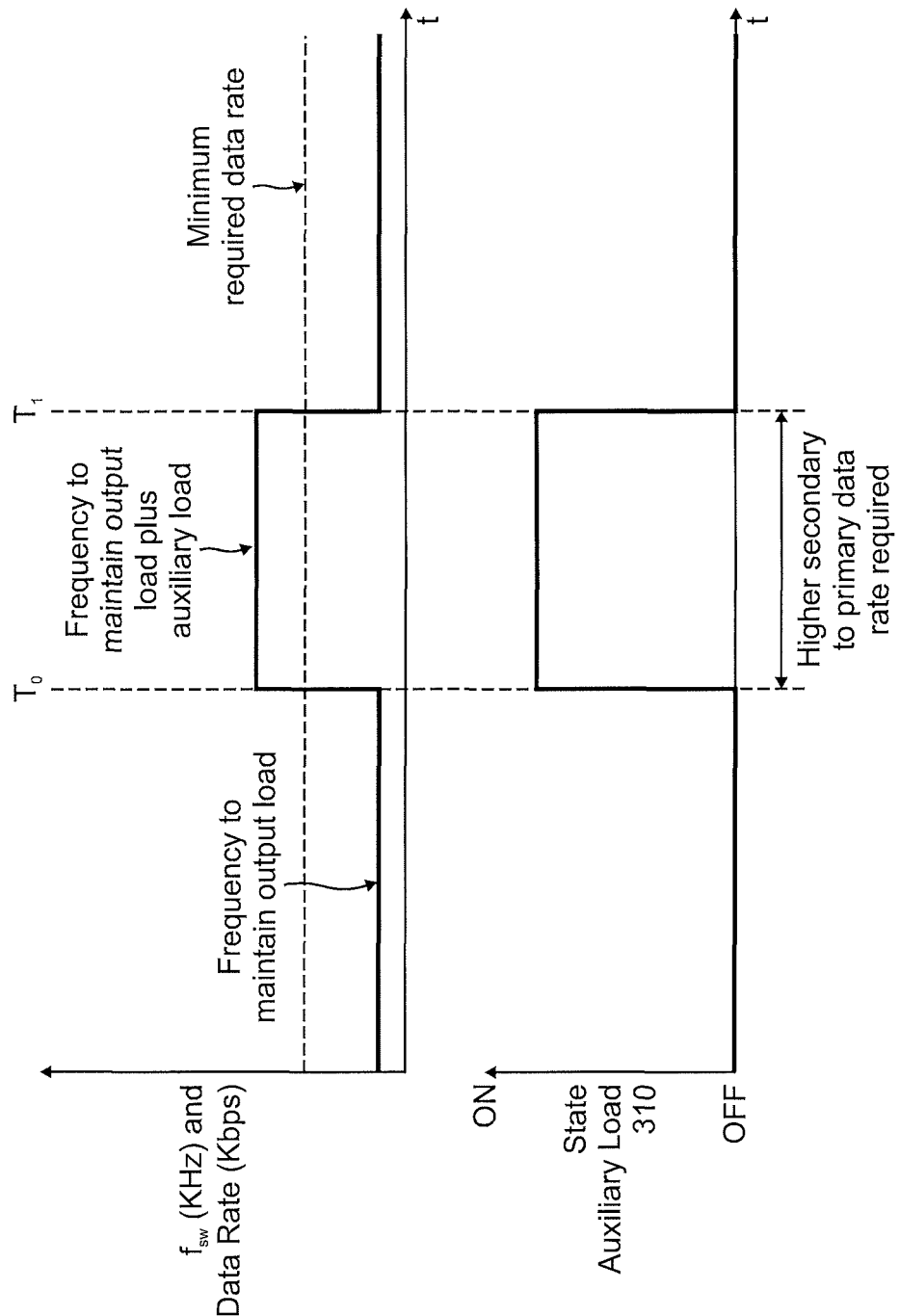
FIG. 5 illustrates how activating an auxiliary load can increase data rates.

FIG. 5 shows the operational state of the auxiliary load 310 as controlled by secondary controller 300. As shown in FIG. 5, the switching frequency and the associated data rate of system 100 before time T0 is below the minimum required data rate for the particular data that system 100 wants to transmit. As further shown in FIG. 5, secondary controller 300 switches on auxiliary load 310 at time T0 and primary controller 200 increases the switching frequency. This results in a switching frequency between time T0 and time T1 where the switching frequency is sufficient to send the desired data in the desired amount of time T0 to T1. At time T1, after the data has been sent, the secondary controller disconnects auxiliary load 310. As shown in FIG. 5, system 100 responds by lowering the switching frequency back to below the minimum required data rate from time period T1 onward. It will be appreciated that the duration of T0 to T1 is variable. It will be further appreciated that more than one cycle of auxiliary load y may be desired to transmit data. It will be appreciated that if system 100 is operating in standby, or with zero output load, secondary controller 300 can trigger an activity signal so as to wake up primary controller 200 to initiate a switching cycle either before, or at substantially the same time as activating auxiliary load 310.

Independent Data Channel

Figure 6:
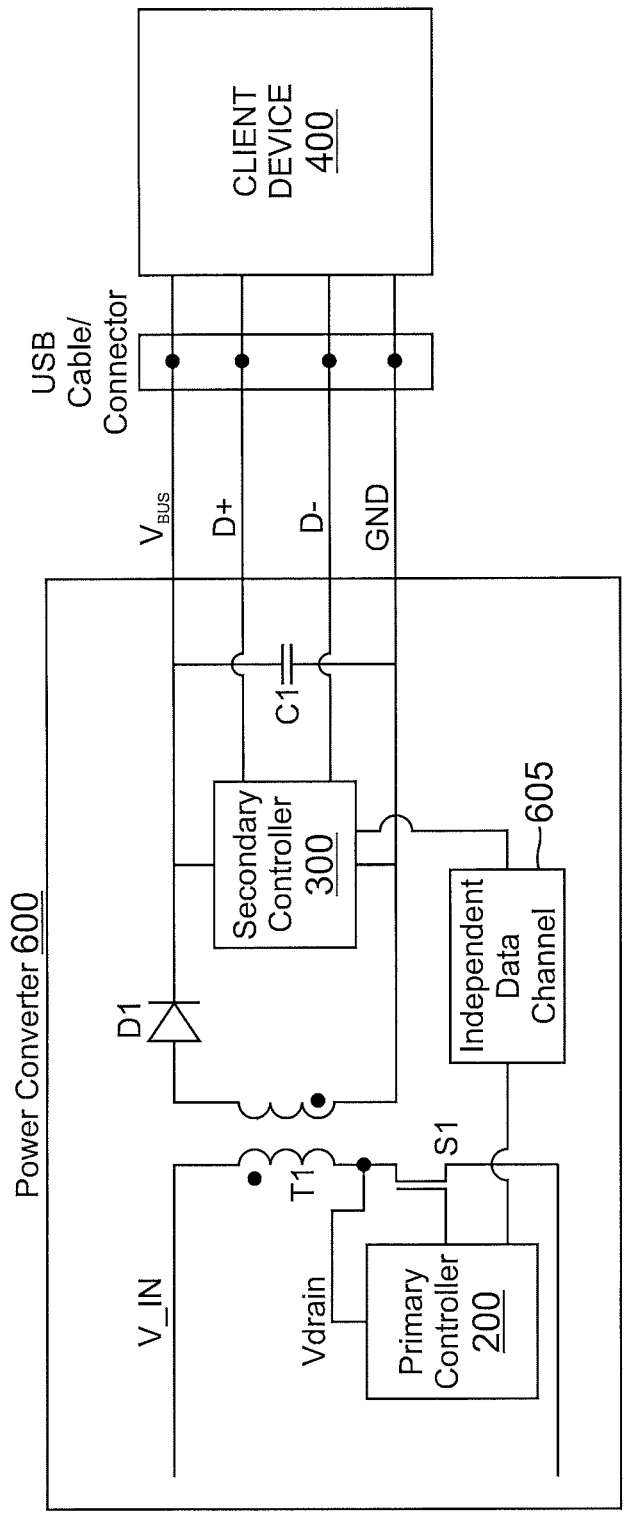
FIG. 6 is a diagram of a flyback converter with an independent data channel in which the secondary-side controller includes an auxiliary load activated for low-load conditions in accordance with an aspect of the disclosure.

As discussed above, an independent data channel may be used in lieu of primary-only data communication. An example flyback converter 600 with an independent data channel 605 is shown in FIG. 6. Independent data channel 605 may be an optoisolator or another suitable device such as a capacitor. Primary controller 200 still uses the drain voltage for power switch S1 to obtain feedback information for the output voltage such as VBUS delivered over the USB cable to the load 400. But secondary controller 300 does not interrupt the rectification of the secondary winding current to transmit data. Instead data (including the equivalent of an activity pulse message) is transmitted from secondary controller 300 through an appropriate pulsing of independent data channel 605. There is no DC connection through an optoisolator or through a capacitor such that isolation is maintained despite the presence of independent data channel 605. As noted above, the data rate for communication through independent data channel 605 is independent of the switching frequency. But the frequency of the feedback information for primary controller 200 is very much dependent on the switching frequency. In that regard, primary controller 200 may need to trigger a power pulse to obtain feedback information in response to an urgent message transmitted through independent data channel 605 such as an over voltage or an under voltage message.

Primary controller 200 detects the pulsing of independent data channel 605 to receive the data transmitted by secondary controller 300. Each pulse represents a bit (or bits). But messages require several pulses such that on a pulse-by-pulse basis, primary controller 200 does not know the content of the corresponding message until all the necessary pulses are received. But if the message is urgent, primary controller 200 may not be able to respond fast enough it if must first wait until all pulses are received before triggering a power switch cycle to obtain feedback information. Thus, primary controller 200 is configured, in low load conditions as determined by the switching frequency being below a threshold level, to generate a power switch cycle upon the receipt of an individual pulse. But the message may not be an under voltage alarm such that the resulting power pulse could drive the output voltage out of regulation. To prevent this, secondary controller 300 activates auxiliary load 310 (FIG. 3) in conjunction with transmitting a pulse through independent data channel 605 when the switching frequency is below the threshold value. In this fashion, primary controller 200 has the feedback information it needs to immediately respond to urgent messages without driving its output voltage out of regulation.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A circuit, comprising:
    an output voltage terminal for providing an output voltage to a client device;
    a ground terminal for providing ground to the client device;
    an auxiliary load in series with a first switch, wherein the auxiliary load and the first switch are connected between the output voltage terminal and the ground terminal;
    a second switch configured to interrupt a rectification of a secondary winding current conducted in a secondary winding of a transformer; and
    a controller configured to respond to a need to transmit voltage pulses to a drain of a power switch transistor connected to a primary winding of the transformer at a desired rate that is greater than a current switching rate for the power switch transistor by, after a resonant oscillation of the drain voltage of the power switch transistor has ceased oscillating, closing the first switch and the second switch to lower the output voltage and to interrupt the rectification of the secondary current to transmit a voltage pulse to the drain of the power switch transistor.

2. The circuit of claim 1, further comprising:
    a synchronous rectification switch transistor coupled to the secondary winding, wherein the controller is further configured to interrupt the rectification of the secondary winding current by closing the synchronous rectification switch transistor.

3. The circuit of claim 1, wherein the controller is further configured to transmit additional ones of the voltage pulses by selecting particular cycles of the resonant oscillation for the transmission of the addition ones of the voltage pulses.

4. The circuit of claim 1, wherein the controller is configured to interface to a load through a USB interface.

5. A method for a flyback converter, comprising:
    cycling on a power switch transistor to develop an output voltage at an output voltage terminal for driving a client device;
    cycling off the power switch transistor to cause a drain voltage for the power switch transistor to resonantly oscillate;
    when the drain voltage for the power switch transistor has ceased resonantly oscillating following the cycling off of the power switch transistor, closing a first switch to couple an auxiliary load between the output voltage terminal and a ground terminal for the client device to reduce the output voltage while closing a second switch to pulse the drain voltage for the power switch transistor;
    at a primary controller for the flyback converter, responding to the pulse of the drain voltage for the power switch transistor by detecting the reduction of the output voltage; and
    increasing a switching frequency for the power switch transistor to a rate sufficient for data transmission responsive to the detection of the reduction of the output voltage.

6. The method of claim 5, wherein the coupling the auxiliary load comprises closing a switch coupled to the auxiliary load.

* * * * *

UNITED STATES PATENT AND TRADEMARK OFFICE
CERTIFICATE OF CORRECTION

PATENT NO. : 10,033,288 B2
APPLICATION NO. : 15/164831
DATED : July 24, 2018
INVENTOR(S) : Jianming Yao Page 1 of 1

It is certified that error appears in the above-identified patent and that said Letters Patent is hereby corrected as shown below:

In the Detailed Description:

In Column 8, Line 22, change "activite" to --activate--.

Signed and Sealed this
Eleventh Day of December, 2018

Andrei Iancu
*Director of the United States Patent and Trademark Office*